US012604921B2

(12) United States Patent
Sagara et al.

(10) Patent No.: US 12,604,921 B2
(45) Date of Patent: Apr. 21, 2026

(54) EMULSIFIED COMPOSITION

(71) Applicant: J-OIL MILLS, INC., Tokyo (JP)

(72) Inventors: Koji Sagara, Tokyo (JP); Junko Arai, Tokyo (JP); Chihiro Ishikawa, Tokyo (JP)

(73) Assignee: J-OIL MILLS, INC., Tokyo (JP)

( * ) Notice: Subject to any disclaimer, the term of this patent is extended or adjusted under 35 U.S.C. 154(b) by 256 days.

(21) Appl. No.: 18/276,980

(22) PCT Filed: Feb. 25, 2022

(86) PCT No.: PCT/JP2022/007842
§ 371 (c)(1),
(2) Date: Aug. 11, 2023

(87) PCT Pub. No.: WO2022/181759
PCT Pub. Date: Sep. 1, 2022

(65) Prior Publication Data
US 2024/0130410 A1    Apr. 25, 2024
US 2024/0225068 A9    Jul. 11, 2024

(30) Foreign Application Priority Data
Feb. 26, 2021    (JP) ................................. 2021-029972
Mar. 26, 2021    (JP) ................................. 2021-053331

(51) Int. Cl.
A23L 29/00    (2016.01)
A23D 7/005    (2006.01)
A23J 3/22    (2006.01)
A23L 29/10    (2016.01)
A23L 29/212    (2016.01)
A23L 29/262    (2016.01)

(52) U.S. Cl.
CPC ............ *A23L 29/262* (2016.08); *A23D 7/005* (2013.01); *A23J 3/227* (2013.01); *A23L 29/10* (2016.08); *A23L 29/212* (2016.08)

(58) Field of Classification Search
CPC ....... A23L 29/10; A23L 29/212; A23L 29/262
See application file for complete search history.

(56) References Cited

U.S. PATENT DOCUMENTS

| | | |
|---|---|---|
| 7,070,827 B2 | 7/2006 | Cavallini et al. |
| 2005/0003071 A1 | 1/2005 | Cavallini et al. |
| 2006/0204644 A1 | 9/2006 | Cavallini et al. |
| 2021/0289806 A1 | 9/2021 | Yoshimura et al. |

FOREIGN PATENT DOCUMENTS

| | | | |
|---|---|---|---|
| CN | 108029987 | * | 5/2018 |
| EP | 3287010 A1 | | 2/2018 |
| JP | 2004-147536 A | | 5/2004 |
| JP | 2005-21163 A | | 1/2005 |
| WO | 2020/026998 A1 | | 2/2020 |

OTHER PUBLICATIONS

Chen et al. (CN 108029987 A—Clarivate Analytics translation) (Year: 2018).*
International Search Report (ISR) dated May 10, 2022 filed in PCT/JP2022/007842.

* cited by examiner

*Primary Examiner* — Elizabeth Gwartney
(74) *Attorney, Agent, or Firm* — RANKIN, HILL & CLARK LLP

(57) ABSTRACT

An emulsified composition containing methyl cellulose, a starch material, edible oil or fat, and an emulsifying material containing protein. The starch material is a component (A) which is a powdery material satisfying (1) a starch content is 75% by mass or more, (2) 3-45% by mass of a low molecular weight starch (a peak molecular weight of equal to or more than $3\times10^3$ and equal to or less than $5\times10^4$) including 5% by mass or more of an amylose content, (3) a degree of swelling in cold water at 25° C. is 5-20 and (4) a content under a sieve with openings of 3.35 mm and on a sieve with openings of 0.038 mm is 60-100% by mass; and/or a component (B) a raw material starch of which is a cornstarch, a tapioca starch, a wheat starch, and/or a pea starch.

12 Claims, No Drawings

EMULSIFIED COMPOSITION

TECHNICAL FIELD

The present invention relates to an emulsified composition, a food, a method for producing an emulsified composition, a method for producing a food, and a method for imparting at least one of a binding property and an elasticity to a food.

BACKGROUND ART

Heretofore, egg whites have been widely used in various processed foods such as processed meat foods, processed meat-like foods, processed sea foods, bakery foods, chilled desserts, and noodles to improve a texture, quality, and the like of the foods. Among them, in the processed meat foods, the processed meat-like foods, and the processed sea foods, the egg whites are normally used to improve the elasticity of the foods to enhance the texture or to bind ingredients to each other. However, there are concerns such as eggs being allergenic, soaring prices of egg whites, unstable supply, and the like.

In addition, in recent years, vegan foods that do not consume animal products have begun to spread due to growing interest in health and environmental problems. The vegan foods are mainly made of protein ingredients using soybean as a main component, and it is important to bind the protein ingredients to each other in terms of product design. However, since an egg white is an animal-derived raw material, it cannot be used in the production of the vegan foods. Therefore, various studies have been made on egg white substitutes.

For example, Patent Document 1 discloses that, when swelling suppression starch and wheat protein are added to noodles, an egg white-like texture can be imparted to the noodles, and thus, these can be used as an egg white substitute. In addition, Patent Document 2 discloses that a coagulable egg white-like composition containing a thermo-coagulable protein and starch can be used as a coagulated egg white substitute having a texture similar to that of an egg white portion of a boiled egg.

RELATED DOCUMENT

Patent Document

[Patent Document 1] Japanese Unexamined Patent Publication No. 2016-67336
[Patent Document 2] Japanese Unexamined Patent Publication No. 2004-147536

SUMMARY OF THE INVENTION

Technical Problem

However, in egg white substitutes reported in the related art, there are not sufficient reports on imparting an egg white-like binding property or elasticity to foods such as processed meat foods, processed meat-like foods, and processed sea foods, and therefore further development of the technology is required.

Thus, the present invention provides an egg white substitute.

Solution to Problem

As a result of intensive studies, the present inventors have found that an emulsified composition containing methyl cellulose, a predetermined starch material, edible oil or fat, and an emulsifying material can be an emulsified composition having an egg white substitute function, for example, excellent egg white-like binding property and elasticity can be imparted to a food, and the present invention is completed.

That is, according to the present invention, there are provided an emulsified composition, a food, a method for producing an emulsified composition, a method for producing a food, and a method for imparting at least one of a binding property and an elasticity to a food described below.

[1] An emulsified composition containing methyl cellulose, a starch material, edible oil or fat, and an emulsifying material, in which the emulsifying material contains protein, and
the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3 \times 10^3$ and equal to or less than $5 \times 10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

[2] The emulsified composition according to [1], in which the emulsified composition has an egg white substitute function.

[3] The emulsified composition according to [1] or [2], in which the emulsified composition is a composition for imparting at least one of a binding property and an elasticity to a food.

[4] The emulsified composition according to any one of [1] to [3], in which a content of the starch material is 0.05 or more and 5 or less in terms of a mass ratio to the methyl cellulose.

[5] The emulsified composition according to any one of [1] to [4], in which a content of the edible oil and fat is 1 or more and 40 or less in terms of a mass ratio to the methyl cellulose.

[6] The emulsified composition according to any one of [1] to [5], in which the starch material is the component (A).

[7] A food including the emulsified composition according to any one of [1] to [6].

[8] The food according to [7], in which the food is one selected from the group consisting of a processed meat food, a processed meat-like food, and a processed sea food.

[9] A method for producing an emulsified composition containing methyl cellulose, a starch material, edible oil or fat, and an emulsifying material, the method including:

obtaining an emulsion by mixing the methyl cellulose, the starch material, the edible oil or fat, and the emulsifying material, in which the emulsifying material contains protein, and the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3\times10^3$ and equal to or less than $5\times10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

[10] The method for producing an emulsified composition according to [9], in which a content of the starch material is 0.05 or more and 5 or less in terms of a mass ratio to the methyl cellulose.

[11] The method for producing an emulsified composition according to [9] or [10], in which a content of the edible oil and fat is 1 or more and 40 or less in terms of a mass ratio to the methyl cellulose.

[12] The method for producing an emulsified composition according to any one of [9] to [11], in which the starch material is the component (A).

[13] A method for producing a food, the method including:

obtaining an emulsified composition by the method for producing an emulsified composition according to any one of [9] to [12]; and obtaining a food by preparing a material containing the emulsified composition.

[14] The method for producing a food according to [13], in which the food is one selected from the group consisting of a processed meat food, a processed meat-like food, and a processed sea food.

[15] A method for imparting at least one of a binding property and an elasticity to a food, the method including: using the emulsified composition according to any one of [1] to [6] or an emulsified composition obtained by the method for producing an emulsified composition according to any one of [9] to [12].

Advantageous Effects of Invention

According to the present invention, an egg white substitute can be provided.

DESCRIPTION OF EMBODIMENTS

Hereinafter, embodiments of the present invention will be described. Unless stated otherwise, the term "to" in a numerical range indicates being equal to or more than a value and equal to or less than another value, both the values at the two ends being included. In addition, in the present embodiment, it is possible for a composition to include each component alone or in a combination of two or more thereof.

(Emulsified Composition)

In the present embodiment, an emulsified composition is an emulsion containing methyl cellulose, a starch material, edible oil or fat, and an emulsifying material. The emulsifying material contains protein, and the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3\times10^3$ and equal to or less than $5\times10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

The emulsified composition specifically further contains moisture (water).

Hereinafter, each component contained in the emulsified composition will be described.

(Methyl Cellulose)

The methyl cellulose is what some of hydrogen atoms of a hydroxyl group of cellulose is substituted with a methoxy group. A degree of substitution of the hydrogen atoms of the hydroxyl group of the methyl cellulose (a ratio of the hydrogen atoms of the hydroxyl group of the cellulose being substituted with the methoxy group) is not limited, and any hydrogen atom may be selected. A content of the methoxy group in the methyl cellulose can be, for example, approximately 15% to 45%.

The content of methyl cellulose in the emulsified composition is preferably 1.2% by mass or more, more preferably 1.5% by mass or more, even more preferably 2.0% by mass or more, and still more preferably 2.5% by mass or more with respect to the entire emulsified composition, from a viewpoint of improving emulsion stability of the emulsified composition or imparting at least one of a binding property and an elasticity to a food.

In addition, from the same viewpoint, the content of methyl cellulose in the emulsified composition is preferably 25% by mass or less, more preferably 20% by mass or less, even more preferably 12% by mass or less, and still more preferably 7% by mass or less with respect to the entire emulsified composition.

(Starch Material)

The starch material is one kind or two or more kinds selected from the group consisting of a component (A) and a component (B) below.

(Component (A))

The component (A) is a powdery material satisfying the conditions (1) to (4).

With regard to condition (1), from a viewpoint of stabilizing the emulsified composition, the component (A)

includes 75% by mass or more, preferably 80% by mass or more, and even more preferably 85% by mass or more of starch with respect to the entire component (A).

In addition, an upper limit of the content of starch in the component (A) is not limited and is 100% by mass or less with respect to the entire component (A). However, the upper limit thereof may be 99.5% by mass or less or 99% by mass or less according to the properties of the composition.

With regard to the component (A), the starch is, for example, a starch for a food, and various-derived starches may be used. For example, as the starch, one or more kinds can be appropriately selected from starches such as cornstarch, potato starch, tapioca starch, wheat starch, rice starch, and bean starch; and processed starches obtained by chemically, physically, or enzymatically processing these starches.

From a viewpoint of stabilizing the emulsified composition, the starch is preferably one kind or two or more kinds selected from tapioca starch, cornstarch, rice starch, and bean starch, and more preferably one kind or two or more kinds selected from tapioca starch, cornstarch, and bean starch.

From a similar viewpoint, the raw material from which the starch is derived is preferably one kind or two or more kinds selected from the group consisting of cassava, corn, rice, and beans.

With regard to condition (2), the component (A) specifically includes a low molecular weight starch and another starch. First, the low molecular weight starch will be described.

From the viewpoint of improving emulsion stability of the emulsified composition, the amylose content in a raw material starch for the low molecular weight starch is equal to or more than 5% by mass, preferably equal to or more than 12% by mass, more preferably equal to or more than 22% by mass, even more preferably equal to or more than 40% by mass, still more preferably equal to or more than 45% by mass, still even more preferably equal to or more than 55% by mass, and still even furthermore preferably equal to or more than 65% by mass. The upper limit of the amylose content in the raw material starch for the low molecular weight starch is not limited, and the upper limit is equal to or less than 100% by mass, preferably equal to or less than 90% by mass, and more preferably equal to or less than 80% by mass.

As a starch having an amylose content of equal to or more than 5% by mass, which is a raw material for the low molecular weight starch, any one kind or two or more kinds selected from the group consisting of cornstarch such as high-amylose cornstarch and cornstarch, tapioca starch, sweet potato starch, potato starch, wheat starch, high-amylose wheat starch, rice starch, bean starch, and processed starches obtained by chemically, physically, or enzymatically processing these raw materials, can be used. From the viewpoint of improving the emulsion stability of the emulsified composition, the starch having an amylose content of equal to or more than 5% by mass is one kind or two or more kinds selected from high-amylose cornstarch, cornstarch, tapioca starch, and bean starch, and more preferably high-amylose cornstarch. As the high-amylose cornstarch, for example, one having an amylose content of equal to or more than 40% by mass is available. The starch having an amylose content of equal to or more than 5% by mass is more preferably a cornstarch having an amylose content of equal to or more than 40% by mass.

A content of the low molecular weight starch in the component (A) is equal to or more than 3% by mass, preferably equal to or more than 8% by mass, and more preferably equal to or more than 13% by mass, from the viewpoint of improving the emulsion stability of the emulsified composition.

From a similar viewpoint, the content of the low molecular weight starch in the component (A) is equal to or less than 45% by mass, preferably equal to or less than 35% by mass, and more preferably equal to or less than 25% by mass.

A peak molecular weight of the low molecular weight starch is equal to or more than $3 \times 10^3$, and preferably equal to or more than $8 \times 10^3$, from the viewpoint of improving the emulsion stability of the emulsified composition.

From a similar viewpoint, the peak molecular weight of the low molecular weight starch is equal to or less than $5 \times 10^4$, preferably equal to or less than $3 \times 10^4$, and more preferably equal to or less than $1.5 \times 10^4$. A method for measuring the peak molecular weight of a low molecular weight starch will be described in the section of Examples.

Here, from the viewpoint of having excellent production stability, the low molecular weight starch is preferably one kind or two or more kinds selected from the group consisting of an acid-treated starch, an oxidation-treated starch, and an enzyme-treated starch, and the low molecular weight starch is more preferably an acid-treated starch.

The conditions of an acid treatment for obtaining an acid-treated starch are not limited; however, for example, the starch can be treated as follows.

First, a starch having an amylose content of equal to or more than 5% by mass, which is a raw material, and water are introduced into a reactor, and an acid is further introduced. Alternatively, acid water obtained by dissolving an inorganic acid in advance in water and the starch as a raw material are introduced into a reactor. From the viewpoint of performing the acid treatment more stably, it is desirable that the total amount of starch in the reaction is in a state of being homogeneously dispersed in an aqueous phase, or in a slurrified state. To do so, the concentration of the starch slurry for performing the acid treatment is adjusted to be in the range of, for example, equal to or more than 10% by mass and equal to or less than 50% by mass, and preferably equal to or more than 20% by mass and equal to or less than 40% by mass. When the slurry concentration is too high, the slurry viscosity may increase, and uniform stirring of the slurry may be difficult.

Specific examples of the acid to be used for the acid treatment include inorganic acids such as hydrochloric acid, sulfuric acid, and nitric acid, which can be utilized regardless of the type, purity, and the like.

With regard to the acid treatment reaction conditions, for example, the inorganic acid concentration at the time of the acid treatment is preferably equal to or greater than 0.05 normality (N) and equal to or less than 4 N, more preferably equal to or greater than 0.1 N and equal to or less than 4 N, and even more preferably equal to or greater than 0.2 N and equal to or less than 3 N, from the viewpoint of stably obtaining the acid-treated starch. From a similar viewpoint, the reaction temperature is preferably equal to or higher than 30° C. and equal to or lower than 70° C., more preferably equal to or higher than 35° C. and equal to or lower than 70° C., and even more preferably equal to or higher than 35° C. and equal to or lower than 65° C., and from a similar viewpoint, the reaction time is preferably equal to or more than 0.5 hours and equal to or less than 120 hours, more preferably equal to or more than 1 hour and equal to or less than 72 hours, and even more preferably equal to or more than 1 hour and equal to or less than 48 hours.

Regarding the starch other than the low molecular weight starch in the component (A), for example, the starch can be selected from the above-mentioned starches and used. Preferably, the starch other than the low molecular weight starch in the component (A) is one kind or two or more kinds selected from the group consisting of cornstarch, wheat starch, potato starch, tapioca starch, bean starch, and processed starches thereof.

With regard to condition (3), from the viewpoint of improving the emulsion stability of the emulsified composition, a degree of swelling in cold water of the component (A) at 25° C. is equal to or more than 5, preferably equal to or more than 6, and more preferably equal to or more than 6.5.

From a similar viewpoint, the degree of swelling in cold water of the component (A) at 25° C. is equal to or lower than 40, preferably equal to or lower than 35, more preferably equal to or lower than 20, even more preferably equal to or lower than 17, still more preferably equal to or lower than 13, and still even more preferably equal to or lower than 12.

Here, a method for measuring the degree of swelling of the component (A) in cold water will be described in a section of Examples.

With regard to condition (4), a content under a sieve with openings of 3.35 mm and on a sieve with openings of 0.038 mm in the component (A) is equal to or more than 60% by mass, preferably equal to or more than 70% by mass, more preferably equal to or more than 80% by mass, even more preferably equal to or more than 90% by mass, and still more preferably equal to or more than 95% by mass, with respect to the entirety of the component (A) from the viewpoint of improving the emulsion stability of the emulsified composition.

From a similar viewpoint, the content under a sieve with openings of 3.35 mm and on a sieve with openings of 0.038 mm in the component (A) is equal to or less than 100% by mass with respect to the entirety of the component (A).

A content under a sieve with openings of 0.5 mm and on a sieve with openings of 0.075 mm in the component (A) is preferably equal to or more than 20% by mass, more preferably equal to or more than 30% by mass, even more preferably equal to or more than 40% by mass, still preferably equal to or more than 50% by mass, still more preferably equal to or more than 60% by mass, and, for example equal to or less than 100% by mass and preferably equal to or less than 90% by mass, from the viewpoint of improving the emulsion stability of the emulsified composition.

A content under a sieve with openings of 0.25 mm and on a sieve with openings of 0.038 mm in the component (A) is preferably equal to or more than 10% by mass, more preferably equal to or more than 15% by mass, even more preferably equal to or more than 20% by mass, still preferably equal to or more than 25% by mass, still more preferably equal to or more than 30% by mass, and, for example equal to or less than 100% by mass, preferably equal to or less than 70% by mass, and more preferably equal to or less than 50% by mass, from the viewpoint of improving the emulsion stability of the emulsified composition.

(Component (B))

Component (B) is a starch material made of one kind or two or more kinds selected from the group consisting of cornstarch such as cornstarch, a waxy cornstarch, or a high-amylose cornstarch, a tapioca starch, wheat starch, and pea starch, as the raw material starch. The component (B) is a starch material other than the component (A). The component (B) may be the raw material starch itself. In addition, the component (B) also includes processed starch obtained by chemically, physically, or enzymatically processing these raw material starches. Examples of the chemical treatments include an esterification treatment such as an acid treatment, an alkali treatment, an oxidation treatment, esterification treatment such as acetylation, etherification treatment such as hydroxypropylation, crosslinking treatment, and the like and examples of the physical treatments may include an oil or fat processing treatment, a heat treatment, a gelatinization treatment, a wet heat treatment, a ball mill treatment, a fine pulverization treatment, and the like. Such treatments may be performed alone or in combination of two or more kinds thereof. The processing treatment performed on the processed starch is preferably a phosphate crosslinking treatment, a gelatinization and acetylation treatment, an acetylation treatment, or an oil or fat processing treatment. Here, the oil or fat processing treatment specifically refers to a heat treatment of a mixture of a raw material starch and one kind or two or more kinds selected from the group consisting of an edible oil and fat and edible oil and fat analogue. The raw material starch of the component (B) is preferably one kind or two or more kinds selected from the group consisting of a tapioca starch, a wheat starch, and a pea starch.

A content of the starch material in the emulsified composition is preferably 0.5% by mass or more, more preferably 1% by mass or more, even more preferably 1.2% by mass or more, and still more preferably 1.6% by mass or more with respect to the entire emulsified composition, from a viewpoint of improving the emulsion stability of the emulsified composition or imparting at least one of a binding property and an elasticity to a food.

In addition, from the same viewpoint, the content of the starch material in the emulsified composition is preferably 20% by mass or less, more preferably 12% by mass or less, even more preferably 7% by mass or less, and still more preferably 4% by mass or less with respect to the entire emulsified composition.

The content of the starch material in the emulsified composition is preferably equal to or more than 0.05, more preferably equal to or more than 0.1, even more preferably equal to or more than 0.3, still more preferably equal to or more than 0.4, and still even more preferably equal to or more than 0.5, in terms of a mass ratio to the methyl cellulose, from the viewpoint of improving the emulsion stability of the emulsified composition or imparting at least one of a binding property and an elasticity to a food.

In addition, from the same viewpoint, the content of the starch material in the emulsified composition is preferably 5 or less, more preferably 3 or less, even more preferably 2 or less, still more preferably 1.5 or less, and even still more preferably 1.3 or less in terms of a mass ratio to the methyl cellulose.

(Edible Oil or Fat)

Specific examples of the edible oil or fat include vegetable oils or fats such as soybean oil, rapeseed oil, palm oil, corn oil, olive oil, sesame oil, perilla oil, safflower oil, sunflower oil, cottonseed oil, rice oil, peanut oil, cacao butter, palm kernel oil, and coconut oil; animal oils or fats such as beef tallow, lard, milk fat, chicken oil, and fish oil; and synthetic oils and fats such as medium-chain fatty acid triglycerides. In addition, processed oils and fats obtained by subjecting these oils and fats to fractionation, hydrogenation, transesterification, and the like may be mentioned.

The edible oil or fat is preferably one kind or two or more kinds selected from the group consisting of rapeseed oil, soybean oil, olive oil, and processed oils and fats obtained by performing fractionation, hydrogenation, transesterification, or the like on these oils and fats.

Furthermore, these edible oils and fats may also be products obtained by treating the oils and fats with flavor-imparting agents such as vegetables, or products obtained by flavoring the oils and fats with flavoring agents such as flavors, seasonings, and natural materials. In addition, components that are usually blended in the edible oil or fat may be contained within a range that does not impair the effects of the invention. Examples thereof include an antioxidant such as tocopherol, ascorbyl palmitate, rosemary extract, tea extract, and licorice extract; a metal chelating agent such as citric acid and malic acid; vitamins such as vitamin A and vitamin D; silicone; flavors; an emulsifier; and the like.

The amount of the edible oil and fat in the emulsified composition can be an amount such that, for example, the content of oil and fat in the emulsified composition is in the following range. Here, the content of oil and fat in the emulsified composition is an amount (total amount of oils and fats) obtained by adding up the edible oil and fat to be blended in the obtaining an emulsion, and the oils and fats included in other blending components.

A content of the oil and fat in the emulsified composition is preferably 3% by mass or more, more preferably 5% by mass or more, even more preferably 8% by mass or more, and still more preferably 15% by mass or more with respect to the entire emulsified composition, from a viewpoint of improving the emulsion stability of the emulsified composition or imparting at least one of a binding property and an elasticity to a food.

In addition, from the same viewpoint, the content of the oil and fat in the emulsified composition is preferably 50% by mass or less, more preferably 40% by mass or less, even more preferably 30% by mass or less, and still more preferably 25% by mass or less with respect to the entire emulsified composition.

The content of the oil and fat in the emulsified composition is preferably equal to or more than 1, more preferably equal to or more than 2, even more preferably equal to or more than 3, still more preferably equal to or more than 4, and still even more preferably equal to or more than 5, in terms of a mass ratio to the methyl cellulose, from the viewpoint of improving the emulsion stability of the emulsified composition or imparting at least one of a binding property and an elasticity to a food.

In addition, from the same viewpoint, the content of the oil and fat in the emulsified composition is preferably 40 or less, more preferably 30 or less, even more preferably 20 or less, still more preferably 15 or less, and even still more preferably 10 or less in terms of a mass ratio to the methyl cellulose.

The content of the oil and fat in the emulsified composition is preferably equal to or more than 0.5, more preferably equal to or more than 1, even more preferably equal to or more than 1.5, and still more preferably equal to or more than 2, in terms of a mass ratio to a total mass of the methyl cellulose and the starch material, from the viewpoint of improving the emulsion stability of the emulsified composition or imparting at least one of a binding property and an elasticity to a food.

In addition, from the same viewpoint, the content of the oil and fat in the emulsified composition is preferably 19 or less, more preferably 17 or less, even more preferably 15 or less, and still more preferably 10 or less, in terms of a mass ratio to a total mass of the methyl cellulose and the starch material.

(Emulsifying Material)

Specifically, the emulsifying material is protein. The emulsifying material may be added as these components themselves, or may be added in the form of a blending component containing at least one of these components.

Examples of the protein include a plant protein and an animal protein. Examples of the plant protein include wheat proteins such as gluten; soybean proteins such as proteins in soymilk, soybean flour, and tofu; seed proteins such as corn proteins, pea proteins, rice proteins, fava bean protein, chickpea proteins, mung bean proteins, and chia seed proteins; and the like. Examples of the animal protein include milk proteins such as whey proteins and casein; blood proteins such as plasma proteins and blood cell proteins; muscle proteins such as meat protein and fish meat protein; gelatin, and collagen.

The protein is preferably one kind or two or more kinds selected from the group consisting of soybean proteins, pea proteins, and wheat proteins.

The emulsifying material is preferably one kind or two or more kinds selected from the group consisting of soymilk, soybean flour, tofu, milk, fresh cream, skim milk powder, whole milk powder, casein, whey, concentrated whey, muscle proteins, pea proteins, fava proteins, chickpea proteins, mungbean proteins, wheat gluten, rice flour, corn flour, and chia seeds, and more preferably one kind or two or more kinds selected from the group consisting of soymilk, soybean flour, pea proteins, and wheat gluten.

A content of the emulsifying material in the emulsified composition (the amount in terms of proteins) is preferably 0.05% by mass or more, more preferably 0.1% by mass or more, even more preferably 0.2% by mass or more, and still more preferably 0.3% by mass or more with respect to the entire emulsified composition, from a viewpoint of improving the emulsion stability of the emulsified composition or imparting at least one of a binding property and an elasticity to a food.

In addition, from the same viewpoint, the content of the emulsifying material in the emulsified composition is preferably 20% by mass or less, more preferably 10% by mass or less, even more preferably 8% by mass or less, and still more preferably 5% by mass or less with respect to the entire emulsified composition.

The content of the emulsifying material in the emulsified composition (the amount in terms of proteins) is preferably equal to or more than 0.02, more preferably equal to or more than 0.05, even more preferably equal to or more than 0.08, and still more preferably equal to or more than 0.1, in terms of a mass ratio to the methyl cellulose, from the viewpoint of improving the emulsion stability of the emulsified composition or imparting at least one of a binding property and an elasticity to a food.

In addition, from the same viewpoint, the content of the emulsifying material in the emulsified composition is preferably 10 or less, more preferably 8 or less, even more preferably 5 or less, and still more preferably 3 or less, in terms of a mass ratio to the methyl cellulose.

(Moisture)

A total content of moisture (water) in the emulsified composition is preferably 42% by mass or more, more preferably 50% by mass or more, even more preferably 60% by mass or more, and still more preferably 70% by mass or more with respect to the entire emulsified composition, from a viewpoint of improving the emulsion stability of the emulsified composition or imparting at least one of a binding property and an elasticity to a food.

In addition, from the same viewpoint, the total content of the moisture in the emulsified composition is preferably 95% by mass or less, more preferably 90% by mass or less, even more preferably 88% by mass or less, and still more preferably 85% by mass or less with respect to the entire emulsified composition.

The total content of the moisture in the emulsified composition is preferably equal to or more than 5, more preferably equal to or more than 10, even more preferably equal to or more than 15, and still more preferably equal to or more than 20, in terms of a mass ratio to the methyl cellulose, from the viewpoint of improving the emulsion stability of the emulsified composition or imparting at least one of a binding property and an elasticity to a food.

In addition, from the same viewpoint, the total content of the moisture in the emulsified composition is preferably 80 or less, more preferably 70 or less, even more preferably 60 or less, and still more preferably 50 or less, in terms of a mass ratio to the methyl cellulose.

The total content of the moisture in the emulsified composition is preferably equal to or more than 5, more preferably equal to or more than 8, even more preferably equal to or more than 12, and still more preferably equal to or more than 15, in terms of a mass ratio to a total mass of the methyl cellulose and the starch material, from the viewpoint of improving the emulsion stability of the emulsified composition or imparting at least one of a binding property and an elasticity to a food.

In addition, from the same viewpoint, the total content of the moisture in the emulsified composition is preferably 50 or less, more preferably 40 or less, even more preferably 30 or less, and still more preferably 20 or less, in terms of a mass ratio to a total mass of the methyl cellulose and the starch material.

The total content of the moisture in the emulsified composition is preferably equal to or more than 1, more preferably equal to or more than 1.5, even more preferably equal to or more than 2, still more preferably equal to or more than 2.5, and still even more preferably equal to or more than 3, in terms of a mass ratio to the edible oil and fat, from the viewpoint of improving the emulsion stability of the emulsified composition or imparting at least one of a binding property and an elasticity to a food.

In addition, from the same viewpoint, the total content of the moisture in the emulsified composition is preferably 30 or less, more preferably 25 or less, even more preferably 20 or less, still more preferably 15 or less, and even still more preferably 13 or less in terms of a mass ratio to the edible oil and fat.

Here, the moisture, as a raw material of the emulsified composition, may be added as water or may be added as a blending component including moisture such as soymilk or the like.

Here, the total content of the moisture in the emulsified composition is the amount obtained by adding up the water blended in the obtaining the emulsion, and the water included in the components other than the methyl cellulose and the starch material among the components included in other blending components.

In the emulsified composition, components other than the above-mentioned components may also be appropriately blended. Specific examples of such components include one kind or two or more kinds selected from the group consisting of salts, such as magnesium salts such as magnesium chloride and magnesium sulfate, potassium salts such as potassium chloride, calcium salts such as calcium chloride, calcium carbonate, and calcium sulfate, and sodium salts such as sodium chloride (table salt); coagulating agents such as glucono-delta-lactone; and sugars such as lactose.

The emulsified composition may have fluidity or may be in a form of solid. In addition, in the present embodiment, an emulsified type of the emulsified composition may be either an oil-in-water type or a water-in-oil type, and the oil-in-water type is preferable from a viewpoint of more suitably exhibiting a function of the methyl cellulose.

(Method for Producing Emulsified Composition)

In the present embodiment, the method for producing an emulsified composition is a method for producing an emulsified composition including methyl cellulose, a starch material, an edible oil or fat, and an emulsifying material, the method including obtaining an emulsion by mixing the methyl cellulose, the starch material, the edible oil or fat, and the emulsifying material.

The emulsifying material contains protein, and the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3 \times 10^3$ and equal to or less than $5 \times 10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

By obtaining the emulsified composition by such a production method and using this in a food, it is possible to obtain a food imparted with excellent binding property or elasticity.

The mixing method in the obtaining an emulsified composition can be selected, for example, according to the type of food to which the emulsified composition is applied, and the properties of the emulsifying material.

Specifically, when the emulsifying material is a powder, the methyl cellulose, the starch material, the emulsifying material and the edible oil or fat are uniformly suspended, water is added thereto, and the mixture is mixed. The water to be added is preferably ice water. In a case where a mixing device at this time is a hand mixer, the mixture is mixed for 30 seconds to 5 minutes, and preferably 1 minute to 3 minutes. A temperature during the mixing can be, for example, about 2° C. to 10° C.

In addition, when the emulsifying material is a liquid, the mixture can be prepared by uniformly suspending the methyl cellulose, the starch material, and the edible oil or fat, adding the emulsifying material thereto, and mixing the components in the same manner as described above.

However, since the optimum emulsification conditions vary even depending on the stirring speed, the shape of the stirring blade, the shape of the stirring container, and the charge-in weight of each raw material, the method is not limited to the above-described method.

Furthermore, the method for producing an emulsified composition may further include one or two kinds of steps selected from the group consisting of frozen storage and refrigerated storage, after the obtaining an emulsified composition.

A storage temperature for freezing may be, for example, equal to or higher than −100° C. and lower than 0° C. The storage temperature for refrigeration may be, for example, equal to or higher than 0° C. and equal to or lower than 15° C.

The emulsified composition obtainable in the present embodiment has, for example, an egg white substitute function. In addition, by using the emulsified composition obtainable in the present embodiment, for example, it is possible to impart at least one of a binding property and an elasticity to a food.

(Food)

The emulsified composition obtainable in the present embodiment can be appropriately used in a food. Specific examples of the food include a processed meat food, a processed meat-like food, a processed sea food, a bakery food, a chilled dessert, noodles, a processed egg-like food, and the like. The food preferably includes a processed meat food, a processed meat-like food, and a processed sea food.

(Processed Meat Food and Processed Meat-Like Food)

The emulsified composition obtainable in the present embodiment is suitably used for, for example, a processed meat food, or a processed meat-like food obtainable by substituting the meat in a processed meat food with a plant protein.

Specific examples of the processed meat food or the processed meat-like food include nuggets such as chicken nuggets; meat pastes such as hamburg steaks, meatballs, sausages, shumai, or dumplings, meat fillings such as meat buns or Chinese buns, and the like. The processed meat food or the processed meat-like food is preferably selected from the group consisting of hamburg steaks, sausages, and nuggets.

The meat in the processed meat food may be specifically at least one kind selected from the group consisting of meat of mammals such as cows, pigs, sheep and goats; and meat of birds typified by poultry such as chickens, domestic ducks, turkeys, geese, and wild ducks. The meat is preferably at least one kind selected from the group consisting of chicken, pork, and beef. In addition, the meat is preferably in the form of minced meat or in the form of paste, such as minced meat or surimi.

(Processed Sea Food)

The emulsified composition obtainable in the present embodiment is appropriately used in a processed sea food. Specific examples of processed sea food include fish paste products such as tsumire, Kamaboko, fish sausage, and hanpen; grilled fish, shrimp cutlet, fried shrimp, fried fish, and the like. The processed sea food is preferably selected from the group consisting of fish paste products such as kamaboko, tsumire, fish sausage, hanpen, and the like.

Specific examples of the sea food, that is a target in the processed sea food include fishes such as tuna, mamakari (Japanese sardinella), tara (pollock), hairtail, eso (lizard-fish), sardines, saury, mackerel, eel, salmon, horse mackerel, conger eel, monkfish, bonito, Spanish mackerel, herring, yellowtail, cod, sea bream, scorpionfish, southern cod, shiroganedara (*Merluccius productus*), kintokidai (*Priacanthus macracanthus*), alfonsino, itoyoridai (Threadfin bream), Atka mackerel, blue shark, hammerhead shark, mako shark, akauo (Pacific ocean perch), Yellowfin sole, aburagarei (Kamchatka flounder), shiroguchi (white croaker), renkodai (deep-sea porgy), kurokajiki (black marlin), konoshiro (gizzard shad), and the like; shellfish such as scallops; cephalopod such as squid, octopus, and the like. In addition, the form of the sea food is preferably in the form of minced meat or in the form of paste, such as minced meat or surimi.

The food may be suitably blended with seasonings, spices, flavors, preservatives, acidulants, thickeners, gelling agents, antioxidants, or the like, and vegetable ingredients such as onions, carrots, bell peppers, cabbages, or the like.

A content of the emulsified composition in the food is preferably 1% by mass or more, more preferably 1.5% by mass or more, even more preferably 2% by mass or more, still more preferably 3% by mass or more, and even still more preferably 5% by mass or more with respect to the entire food, from a viewpoint of imparting at least one of the binding property and the elasticity to a food.

In addition, from the same viewpoint, the content of the emulsified composition in the food is preferably 70% by mass or less, more preferably 50% by mass or less, even more preferably 40% by mass or less, still more preferably 35% by mass or less, and even still more preferably 30% by mass or less with respect to the entire food.

(Method for Producing Food)

The method for producing a food includes, for example, obtaining an emulsified composition by the above-mentioned method for producing an emulsified composition according to the present embodiment; and obtaining a food by preparing materials containing the obtained emulsified composition.

The obtaining a food preferably includes cooking by heating, from the viewpoints of a bactericidal effect on the food and enhancement of storage stability. Specific examples of cooking by heating include cooking by heating in an oven or the like; cooking by microwave heating; cooking by heating in a steam convection oven or the like; cooking by heating on a thinly oiled frying pan or an iron plate; and deep-frying in edible oils and fats at approximately 100° C. to 200° C., and from the same viewpoint, cooking by heating in an oven or the like or cooking by heating on a frying pan or an iron plate is preferable.

(Method for Imparting at Least One of Binding Property and Elasticity to Food)

The present embodiment provides a method for imparting at least one of a binding property and an elasticity to a food, the method including using the emulsified composition described above. Such a method specifically includes blending the emulsified composition described above as a raw material of a food. By using the emulsified composition described above, for example, it is possible to impart egg white-like binding property or elasticity to a food. In addition, it is possible to impart excellent hardness to a food, reduce stickiness of a food, improve juiciness of a food, and the like. In the present embodiment, the binding property refers to a property of binding food materials together, maintaining a shape of a food, and improving a texture of a food, and the elasticity refers to a property that, when a pressure is applied to a food, a force to repel it is generated.

The present invention includes the following aspects.

1. An emulsified composition including methyl cellulose, a starch material, edible oil or fat, and an emulsifying material, in which the emulsifying material contains protein, and the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3\times10^3$ and equal to or less than $5\times10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

2. The emulsified composition according to 1., in which the emulsified composition is a composition for imparting at least one of a binding property or an elasticity to a food.

3. The emulsified composition according to 1. or 2., in which a content of the starch material is 0.05 or more and 5 or less in terms of a mass ratio to the methyl cellulose.

4. The emulsified composition according to any one of 1. to 3., in which a content of the edible oil and fat is 1 or more and 40 or less in terms of a mass ratio to the methyl cellulose.

5. The emulsified composition according to any one of 1. to 4., in which the starch material is the component (A).

6. A food containing the emulsified composition according to any one of 1. to 5.

7. The food according to 6., in which the food is one kind or two or more kinds selected from the group consisting of a processed meat food, a processed meat-like food, and a processed sea food.

8. A method for producing an emulsified composition containing methyl cellulose, a starch material, edible oil or fat, and an emulsifying material, the method including:

obtaining an emulsion by mixing the methyl cellulose, the starch material, the edible oil or fat, and the emulsifying material, in which the emulsifying material contains protein, and the starch material is one or two kinds selected from the group consisting of a component (A) and a component (B) below.

component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3\times10^3$ and equal to or less than $5\times10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

9. The method for producing an emulsified composition according to 8., in which a content of the starch material is 0.05 or more and 5 or less in terms of a mass ratio to the methyl cellulose.

10. The method for producing an emulsified composition according to 8. or 9., in which a content of the edible oil and fat is 1 or more and 40 or less in terms of a mass ratio to the methyl cellulose.

11. The method for producing an emulsified composition according to any one of 8. to 10., in which the starch material is the component (A).

12. A method for producing a food, the method including:

obtaining an emulsified composition by the method for producing an emulsified composition according to any one of 8. to 11.; and obtaining a food by preparing a material containing the emulsified composition.

13. The method for producing a food according to 12., in which the food is one kind or two or more kinds selected from the group consisting of a processed meat food, a processed meat-like food, and a processed sea food.

14. A method for imparting at least one of a binding property and an elasticity to a food, the method including:

using the emulsified composition according to any one of 1. to 5. or an emulsified composition obtained by the method for producing an emulsified composition according to any one of 8. to 11.

EXAMPLES

Hereinafter, the present invention will be described in more detail with reference to examples, but the present invention is not limited thereto.

The raw materials below were mainly used as the raw materials.

1. Raw Material for Producing Emulsified Composition
(Methyl Cellulose)

Methyl cellulose A: Heatgel Kiwami, manufactured by Unitec Foods Co., Ltd. (a methoxy group of 25% to 33%, a melting temperature of 2° C. or lower)

Methyl cellulose B: Heatgel Cho, manufactured by Unitec Foods Co., Ltd. (a methoxy group of 25% to 33%, a melting temperature of 10° C. or lower)

Methyl cellulose C: Metolose MCE-100TS, manufactured by Shin-Etsu Chemical Co., Ltd. (a methoxy group of 25% to 33%, a melting temperature of 10° C. or less)

(Starch Material)

Component (A): Powdery material 1 obtained in Production Example 2

Distarch phosphate (phosphate crosslinked starch) from tapioca starch: ACTBODY TP-4W, manufactured by J-Oil Mills, Inc.

Gelatinized and acetylated distarch phosphate from tapioca starch: Gelcol GT-α, manufactured by J-Oil Mills, Inc.

Acetylated wheat starch: Gelcol WA-20, manufactured by J-Oil Mills, Inc.

Distarch phosphate from potato starch: Gelcol KPS-200, manufactured by J-Oil Mills, Inc.

Oil or fat-processed pea starch: a product produced by adding and mixing 0.2% of a safflower oil (a safflower salad oil, manufactured by Summit Oil Co., Ltd.) to and with an unprocessed pea starch (PURIS Pea Starch PS85-B, manufactured by Puris), and heating a resultant product in a thermostatic chamber (70° C.) for 21 days (Edible Oil or Fat)

Rapeseed oil: AJINOMOTO Sarasara Canola Oil, manufactured by J-Oil Mills, Inc.

Seasoning oil: J-OILPRO meat cooked oil, manufactured by J-Oil Mills, Inc.

(Emulsifying Material or Material Including Emulsifying Material)

Soymilk: Delicious unadjusted soymilk, manufactured by Kikkoman Beverage Co., Ltd. (a protein content of 4.2% by mass, a lipid content of 3.7% by mass)

Defatted soy flour A: Eslipo, manufactured by J-Oil Mills, Inc. (a protein content of 38.0% by mass, a lipid content of 20.0% by mass)

Defatted soy flour B: Nikka Milky S, manufactured by J-Oil Mills, Inc. (a protein content of 50.0% by mass, a lipid content of 1.5% by mass)

Powdery wheat protein: A-Glu WP, manufactured by Glico Nutrition Foods Co., Ltd. (a protein content of 90.0% by mass, a lipid content of 1.0% by mass)

Pea protein: NUTRALYS F85M, manufactured by Rocket Japan Co., Ltd. (a protein content of 84.3% by mass, a lipid content of 1.0% by mass)

2. Other Raw Materials

Granular soybean protein material A: FUJINIK ACE 500, manufactured by FUJI OIL CO., LTD.

Granular soybean protein material B: VEGITEX SHF, manufactured by FUJI OIL CO., LTD.

Granular soybean protein material C: Apex 950, manufactured by FUJI OIL CO., LTD.

Umami seasoning: AJINOMOTO, manufactured by Ajinomoto Co., Inc.

Beetroot powder: Beetroot powder, manufactured by Maruha Bussan Co., Ltd.

Caramel pigment: caramel, manufactured by Kosei Co., Ltd.

Sauteed onion: Onion saute, manufactured by Kobe Bussan Co., Ltd.

Solid fat: Euromelt 20B, manufactured by J-Oil Mills, Inc.

Cylindrical fat: product produced by the same producing method as the fat composition 13 described in Pamphlet of International Publication No. WO2020/004058

Bread crumbs: Soft bread crumbs, manufactured by Nisshin Foods Co., Ltd.

Alaska pollock surimi: Surimi grade KA

Powdery soybean protein material: New Fuji Pro SEH, manufactured by Fuji Oil Co., Ltd.

Potato starch: Gelcol BP-200, manufactured by J-Oil Mills, Inc.

Instant bouillon: Instant bouillon, manufactured by Yamaki Co., Ltd.

<Production of Starch Material>

(Production Example 1) Production of Low Molecular Weight Starch

An acid-treated high-amylose cornstarch was produced as a low molecular weight starch that was a raw material for a powdery material 1.

The high-amylose cornstarch (manufactured by J-Oil Mills, Inc., HS-7, amylose content 70% by mass) was suspended in water to prepare a 35.6% (w/w) slurry, and the slurry was heated to 50° C. An aqueous solution of hydrochloric acid prepared at 4.25 N was added to the slurry with stirring, the amount of the aqueous solution being 1/9 times in terms of slurry mass ratio, and a reaction was initiated. After the reaction was performed for 16 hours, the reaction mixture was neutralized with 3% NaOH, washed with water, dehydrated, and dried to obtain an acid-treated high-amylose cornstarch.

The peak molecular weight of the acid-treated high-amylose cornstarch thus obtained was measured by the method described below, and the peak molecular weight was $1.2 \times 10^4$.

(Method for Measuring Peak Molecular Weight)

Measurement of the peak molecular weight was carried out by using an HPLC unit manufactured by Tosoh Corporation (pump DP-8020, RI detector RS-8021, degassing apparatus SD-8022).

(1) A sample was pulverized, and a fraction under a sieve with openings of 0.15 mm was collected with sieves of the JIS-Z8801-1 standard. This collected fraction was suspended in a mobile phase at a concentration of 1 mg/mL, and the suspension was heated at 100° C. for 3 minutes to completely dissolve. Filtration was performed by using a 0.45-μm filtration filter (manufactured by ADVANTEC MFS, Inc., DISMIC-25HP PTFE 0.45 μm), and the filtrate was used as an analysis sample.

(2) The molecular weight was measured under the following analytical conditions.

Column: Two units of TSKgel α-M (7.8 mmp, 30 cm) (manufactured by Tosoh Corporation)

Flow rate: 0.5 mL/min

Mobile phase: 5 mM sodium nitrate-containing 90% (v/v) dimethyl sulfoxide solution Column temperature: 40° C.

Analysis amount: 0.2 mL (3) Detector data was collected using software (MULTI-STATION GPC-8020 model II data collection ver5.70, manufactured by Tosoh Corporation), and the molecular weight peak was calculated.

For the calibration curve, pullulans having known molecular weights (Shodex Standard P-82, manufactured by Showa Denko K.K.) were used.

(Method for Measuring Degree of Swelling in Cold Water)

(1) A sample was heated and dried at 125° C., the moisture was measured using a moisture meter (Kensei Kogyo Co., Ltd., model number MX-50), and the dried substance mass was calculated from the obtained moisture value.

(2) 1 g of the sample in terms of this dried substance mass was dispersed in 50 mL of water at 25° C., the dispersion was stirred gently in a thermostatic oven at 25° C. for 30 minutes, and then the dispersion was centrifuged (centrifugal separator: manufactured by Hitachi Koki Co., Ltd., Hitachi Tabletop Centrifuge CT6E type; rotor: T4SS type swing rotor; adapter: 50TC×2S adapter) at 3000 rpm for 10 minutes to be separated into a sediment layer and a supernatant layer.

(3) The supernatant layer was removed, the mass of the sediment layer was measured, and this was designated as B (g).

(4) The mass obtained when the sediment layer was solid-dried (105° C., constant weight) was designated as C (g).

(5) The value obtained by dividing B by C was defined as the degree of swelling in cold water.

(Production Example 2) Production of Powdery Material 1

79% by mass of cornstarch, 20% by mass of an acid-treated high-amylose cornstarch obtained in Production Example 1, and 1% by mass of calcium carbonate were mixed in a bag until the mixture became sufficiently uniform. The mixture was subjected to a pressurized heating treatment by using a twin-screw extruder (KEI-45 manufactured by Kowa Kogyo, Inc.). The processing conditions are as follows.

Raw material supply: 450 g/min

Added water: 17% by mass

Barrel temperature: 50° C., 70° C., and 100° C. increasing from the raw material inlet port toward the outlet port Outlet port temperature: 100° C. to 110° C.

Speed of screw rotation: 250 rpm

A heated and gelatinized product obtained by an extruder treatment in this manner was dried at 110° C. to adjust the water content to 10% by mass.

Next, the dried heated and gelatinized product was pulverized with a tabletop cutter crusher, and then the pulverization product was sieved with sieves of the JIS-Z8801-1 standard. The sieved heated and gelatinized products were mixed at predetermined blending proportions to prepare a powdery material 1 having a particle size distribution shown in Table 1. The degree of swelling in cold water at 25° C. of the powdery material 1 measured by the above-described method is shown in Table 1.

TABLE 1

|  |  | Powdery material 1 |
|---|---|---|
| Fraction (% by mass) | Under 3.35 mm sieve and on 1.4 mm sieve | |
| | Under 1.4 mm sieve and on 1 mm sieve | |
| | Under 1 mm sieve and on 0.5 mm sieve | 18.0 |
| | Under 0.5 mm sieve and on 0.25 mm sieve | 42.0 |
| | Under 0.25 mm sieve and on 0.15 mm sieve | 15.0 |
| | Under 0.15 mm sieve and on 0.075 mm sieve | 20.0 |
| | Under 0.075 mm sieve and on 0.038 mm sieve | 3.7 |
| | Under 0.038 mm sieve | 1.3 |
| | Total | 100.0 |
| | Under 3.35 mm sieve and on 0.038 mm sieve | 98.7 |
| | Under 0.5 mm sieve and on 0.075 mm sieve | 77.0 |
| | Under 0.25 mm sieve and on 0.038 mm sieve | 38.7 |
| Degree of swelling in cold water | | 10.5 |

EXAMPLES 1 TO 8

In each example, an emulsified composition (oil-in-water type) was prepared and evaluated.

Example 1

With the blending shown in Table 2, emulsified compositions of Examples 1-1 to 1-3 and Comparative Example 1 were prepared and baked by the following method.

Example 1-1

1. Methyl cellulose, a starch material, and salt were weighed into a bowl and mixed.

2. An edible oil or fat was added to a mixed of the part 1. and lightly mixed.

3. The mixture of the part 2. was cooled on ice, and soymilk was added thereto and mixed with a hand mixer (a hand mixer MK-H4-W, manufactured by Panasonic) for about 2 minutes to prepare an emulsified composition.

4. The emulsified composition (45 g) of the part 3. was baked in a frying pan for 60 seconds on a front side and 60 seconds on a back side.

Example 1-2

1. Methyl cellulose, a starch material, and salt were weighed into a bowl and mixed.

2. A mixture of the part 1. was cooled on ice, soymilk was added thereto and mixed with a hand mixer for about 2 minutes.

3. The edible oil or fat was added to the mixture of the part 2. and mixed to produce an emulsified composition.

4. The emulsified composition (45 g) of the part 3. was baked in a frying pan for 60 seconds on a front side and 60 seconds on a back side.

Example 1-3

1. Water was added to methyl cellulose to prepare a methyl cellulose solution.

2. A starch material, salt, and edible oil or fat were weighed into a bowl and mixed.

3. A mixture of the part 2. was cooled on ice, and the soymilk was added thereto and mixed with a hand mixer for about 2 minutes.

4. The methyl cellulose solution of the part 1. was added to the mixture of the part 3. and mixed with a rubber spatula to prepare an emulsified composition.

5. The emulsified composition (45 g) of the part 4. was baked in a frying pan for 60 seconds on a front side and 60 seconds on a back side.

Comparative Example 1

An emulsified composition was prepared and baked by the same method as in Example 1-1, except that the starch material was not added.

A state of the emulsified composition before heating, a state of the emulsified composition during baking, and a state of the emulsified composition after baking were evaluated. Two specialized panelists performed the evaluation on a five-point scale according to the following criteria, and an average point was regarded as a score. A score of equal to or higher than 3 was considered acceptable. The evaluation results are shown in Table 2.

(State Before Heating)

5 points: emulsion in a state in which a peak holds firmly like whipped cream 4 points: emulsion in a creamy state 3 points: uniformly suspended state 2 points: suspended but watery state 1 point: state in which water and oil are separated (State During Baking)

5 points: no syneresis and a shape is maintained 4 points: slight syneresis, but a shape is mostly maintained 3 points: some syneresis, but a shape is barely maintained 2 points: considerable syneresis and a shape has collapsed 1 point: extremely considerable syneresis and a shape is lost during the baking (State after Baking)

5 points: Strong elasticity and hardness, and a shape is maintained 4 points: Some elasticity and slightly soft, but a shape is mostly maintained 3 points: Slight elasticity and soft, but a shape is barely maintained 2 points: Lacks elasticity and soft, and a shape has collapsed 1 point: No elasticity, very soft, and no shape

TABLE 2

| | | Example 1-1 | Example 1-2 | Example 1-3 | Comparative Example 1 |
|---|---|---|---|---|---|
| Blending (parts by mass) | Methyl cellulose A | 1.5 | 1.5 | 1.5 | 1.5 |
| | Powdery material 1 | 1.5 | 1.5 | 1.5 | |
| | Rapeseed oil | 4.0 | 4.0 | 4.0 | 4.0 |
| | Soymilk | 40.0 | 40.0 | 10.0 | 40.0 |
| | Water | | | 30.0 | |
| | Salt | 0.4 | 0.4 | 0.4 | 0.4 |
| | Total | 47.4 | 47.4 | 47.4 | 45.9 |
| Evaluation | State before heating | 5 | 5 | 5 | 4 |
| | State during baking | 5 | 4 | 5 | 3 |
| | State after baking | 5 | 4 | 3 | 2 |

As a result, as shown in Table 2, the elasticity or the hardness after baking was most excellent in a case where the emulsified composition was prepared by the method of Example 1-1. In addition, in Comparative Example 1 not containing the starch material, an emulsified composition having preferable elasticity or hardness could not be obtained after the baking.

Example 2

With the blending shown in Table 3, emulsified compositions of Examples 2-1 to 2-5 and Comparative Example 2 were prepared and baked by the following method.

1. Methyl cellulose, a starch material, and salt were weighed into a bowl and mixed.

2. An edible oil or fat was added to a mixed of the part 1. and lightly mixed.

3. A mixture of the part 2. was cooled on ice, and the soymilk was added thereto and mixed with a hand mixer for about 2 minutes to prepare an emulsified composition.

4. The emulsified composition (45 g) of the part 3. was baked in a frying pan for 60 seconds on a front side and 60 seconds on a back side.

A state of the emulsified composition before heating, a state of the emulsified composition during baking, and a state of the emulsified composition after baking were evaluated by the same method as in Example 1 by two specialized panelists. The evaluation results are shown in Table 3.

TABLE 3

| | | Example 2-1 | Example 2-2 | Example 2-3 | Example 2-4 | Example 2-5 | Comparative Example 2 |
|---|---|---|---|---|---|---|---|
| Blending (parts by mass) | Methyl cellulose A | 1.5 | 1.5 | 1.5 | 1.5 | 1.5 | 1.5 |
| | Powdery material 1 | 1.5 | | | | | |
| | Distarch phosphate from tapioca starch | | 1.5 | | | | |
| | Gelatinized and acetylated distarch phosphate from tapioca starch | | | 1.5 | | | |
| | Acetylated wheat starch | | | | 1.5 | | |
| | Oil or fat-processed pea starch | | | | | 1.5 | |
| | Distarch phosphate from potato starch | | | | | | 1.5 |
| | Rapeseed oil | 4.0 | 4.0 | 4.0 | 4.0 | 4.0 | 4.0 |
| | Soymilk | 40.0 | 40.0 | 40.0 | 40.0 | 40.0 | 40.0 |
| | Salt | 0.4 | 0.4 | 0.4 | 0.4 | 0.4 | 0.4 |
| | Total | 47.4 | 47.4 | 47.4 | 47.4 | 47.4 | 47.4 |
| Evaluation | State before heating | 5 | 5 | 5 | 5 | 5 | 3 |
| | State during baking | 5 | 4 | 5 | 5 | 5 | 3 |
| | State after baking | 5 | 3 | 4 | 4 | 3 | 2 |

As a result, as shown in Table 3, in Examples 2-1 to 2-5, an emulsified composition with an excellent state before the heating, during the baking, and after the baking could be obtained. Among them, an emulsified composition using the powdery material 1 of Example 2-1 was most excellent. In contrast, in a case of Comparative Example 2 in which potato starch was used as the raw material starch for the starch material, an emulsified composition having preferable elasticity or hardness could not be obtained after the baking.

Example 3

With the blending shown in Table 4, emulsified compositions of Examples 3-1 to 3-5 were prepared and baked by the following method.

1. Water or soymilk was weighed and cooled in ice water.
2. Methyl cellulose, a starch material, salt, and an emulsifying material were weighed into a bowl and mixed.

3. An edible oil or fat was added to a mixture of the part 2. and mixed.
4. The water or soymilk of the part 1. was added to a mixture of the part 3. and mixed with a hand mixer for about 2 minutes to prepare an emulsified composition.
5. 15 g of a resultant material of the part 4. was weighed with an aluminum cup, and baked in a steam convection oven (CombiMasterPlusXS, manufactured by RATIONAL) at 200° C. for 5 minutes.
6. The remaining emulsified composition of the part 4. was placed on a frying pan and baked over medium heat for about 3 minutes.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. The evaluation results are shown in Table 4.

TABLE 4

| | | Example 3-1 | Example 3-2 | Example 3-3 | Example 3-4 | Example 3-5 |
|---|---|---|---|---|---|---|
| Blending (parts by mass) | Methyl cellulose A | 1.0 | 1.0 | 1.0 | 1.0 | 1.0 |
| | Powdery material 1 | 1.0 | 1.0 | 1.0 | 1.0 | 1.0 |
| | Rapeseed oil | 4.0 | 4.0 | 4.0 | 4.0 | 4.0 |
| | Soymilk | 40.0 | | | | |
| | Defatted soy flour A | | 0.3 | | | |
| | Defatted soy flour B | | | 0.3 | | |
| | Powdery wheat protein | | | | 0.3 | |
| | Pea protein | | | | | 0.3 |
| | Water | | 40.0 | 40.0 | 40.0 | 40.0 |
| | Salt | 0.4 | 0.4 | 0.4 | 0.4 | 0.4 |
| | Total | 46.4 | 46.7 | 46.7 | 46.7 | 46.7 |
| Evaluation | State before heating | 5 | 5 | 4 | 3 | 5 |
| | State during baking (frying pan baking) | 4 | 5 | 4 | 3 | 5 |
| | State after baking (frying pan baking) | 3 | 5 | 4 | 5 | 5 |
| | State after baking (oven baking) | 3 | 5 | 4 | 5 | 5 |

As a result, as shown in Table 4, in all of the examples, an emulsified composition with an excellent state before the heating, during the baking, and after the baking could be obtained. Among them, in cases of Example 3-2 in which defatted soy flour A was used and Example 3-5 in which pea protein was used, the elasticity or hardness after the baking were more excellent.

Example 4

With the blending shown in Table 5, emulsified compositions of Examples 4-1 to 4-6 were prepared and baked by the same method as in Example 3.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. The evaluation results are shown in Table 5.

TABLE 5

|  |  | Example 4-1 | Example 4-2 | Example 4-3 | Example 4-4 | Example 4-5 | Example 4-6 |
|---|---|---|---|---|---|---|---|
| Blending (parts by mass) | Methyl cellulose A | 1.0 |  |  | 1.0 |  |  |
|  | Methyl cellulose B |  | 1.0 |  |  | 1.0 |  |
|  | Methyl cellulose C |  |  | 1.0 |  |  | 1.0 |
|  | Powdery material 1 | 1.0 | 1.0 | 1.0 | 1.0 | 1.0 | 1.0 |
|  | Rapeseed oil | 4.0 | 4.0 | 4.0 | 4.0 | 4.0 | 4.0 |
|  | Defatted soy flour A | 0.3 | 0.3 | 0.3 |  |  |  |
|  | Pea protein |  |  |  | 0.3 | 0.3 | 0.3 |
|  | Water | 40.0 | 40.0 | 40.0 | 40.0 | 40.0 | 40.0 |
|  | Salt | 0.4 | 0.4 | 0.4 | 0.4 | 0.4 | 0.4 |
|  | Total | 46.7 | 46.7 | 46.7 | 46.7 | 46.7 | 46.7 |
| Evaluation | State before heating | 5 | 5 | 5 | 4 | 4 | 5 |
|  | State during baking (frying pan baking) | 5 | 5 | 4 | 5 | 5 | 4 |
|  | State after baking (frying pan baking) | 5 | 4 | 3 | 5 | 4 | 3 |
|  | State after baking (oven baking) | 5 | 4 | 3 | 5 | 4 | 3 |

As a result, as shown in Table 5, in all of the examples, an emulsified composition with an excellent state before the heating, during the baking, and after the baking could be obtained. Among them, in cases of Examples 4-1 and 4-4 in which the methyl cellulose A was used, the elasticity or hardness after the baking were more excellent.

Example 5

With the blending shown in Table 6, emulsified compositions of Examples 5-1 to 5-5 were prepared and baked by the same method as in Example 3.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. In addition, freezing resistance was also evaluated according to the following criteria. The evaluation results are shown in Table 6.

(Freezing Resistance)

An emulsified composition after the baking was frozen in a freezer at −30° C. for 15 hours and thawed at room temperature, and it was confirmed whether there is a change in a state of the emulsified composition before and after the freezing (whether water or oil flows from the emulsified composition and whether there is sogginess or stickiness). In a case where there was no change in the state, it was determined that the freezing resistance is obtained, and in a case where there is a change in the state, it was determined that the freezing resistance is not obtained.

TABLE 6

| | | Example 5-1 | Example 5-2 | Example 5-3 | Example 5-4 | Example 5-5 |
|---|---|---|---|---|---|---|
| Blending (parts by mass) | Methyl cellulose A | 0.8 | 1.0 | 1.5 | 2.0 | 2.5 |
| | Powdery material 1 | 1.0 | 1.0 | 1.0 | 1.0 | 1.0 |
| | Rapeseed oil | 4.0 | 4.0 | 4.0 | 4.0 | 4.0 |
| | Defatted soy flour A | 0.3 | 0.3 | 0.3 | 0.3 | 0.3 |
| | Water | 40.0 | 40.0 | 40.0 | 40.0 | 40.0 |
| | Salt | 0.4 | 0.4 | 0.4 | 0.4 | 0.4 |
| | Total | 46.5 | 46.7 | 47.2 | 47.7 | 48.2 |
| Evaluation | State before heating | 3 | 4 | 5 | 5 | 5 |
| | State during baking (frying pan baking) | 4 | 5 | 5 | 5 | 4 |
| | State after baking (frying pan baking) | 3 | 4 | 5 | 5 | 5 |
| | State after baking (oven baking) | 3 | 4 | 5 | 5 | 5 |
| | Freezing resistance | Obtained | Obtained | Obtained | Obtained | Obtained |

As a result, as shown in Table 6, in all of the examples, an emulsified composition with an excellent state before the heating, during the baking, and after the baking could be obtained. Among them, in Examples 5-3 to 5-5 in which the content of the methyl cellulose was relatively great, the elasticity or hardness after the baking was more excellent, and was most excellent in Example 5-5. In addition, it was confirmed that the freezing resistance was obtained in all the examples.

Example 6

With the blending shown in Table 7, emulsified compositions of Examples 6-1 to 6-5 were prepared and baked by the same method as in Example 3.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. In addition, the freezing resistance was evaluated by the same method as in Example 5. The evaluation results are shown in Table 7.

TABLE 7

| | | Example 6-1 | Example 6-2 | Example 6-3 | Example 6-4 | Example 6-5 |
|---|---|---|---|---|---|---|
| Blending (parts by mass) | Methyl cellulose A | 1.0 | 1.0 | 1.0 | 1.0 | 1.0 |
| | Powdery material 1 | 1.0 | 1.0 | 1.0 | 1.0 | 1.0 |
| | Rapeseed oil | 4.0 | 4.0 | 4.0 | 4.0 | 4.0 |
| | Defatted soy flour A | 0.3 | 0.6 | 0.9 | 1.2 | 1.5 |
| | Water | 40.0 | 40.0 | 40.0 | 40.0 | 40.0 |
| | Salt | 0.4 | 0.4 | 0.4 | 0.4 | 0.4 |
| | Total | 46.7 | 47.0 | 47.3 | 47.6 | 47.9 |

TABLE 7-continued

|  |  | Example 6-1 | Example 6-2 | Example 6-3 | Example 6-4 | Example 6-5 |
|---|---|---|---|---|---|---|
| Evaluation | State before heating | 4 | 4 | 4 | 4 | 4 |
|  | State during baking (frying pan baking) | 5 | 5 | 5 | 5 | 5 |
|  | State after baking (frying pan baking) | 4 | 5 | 5 | 5 | 5 |
|  | State after baking (oven baking) | 4 | 5 | 5 | 5 | 5 |
|  | Freezing resistance | Obtained | Obtained | Obtained | Obtained | Obtained |

As a result, as shown in Table 7, in all of the examples, an emulsified composition with an excellent state before the heating, during the baking, and after the baking could be obtained. Among them, an emulsified composition of Example 6-4 had most excellent elasticity or hardness after the baking. Emulsified compositions of Examples 6-2, 6-3, and 6-5 had similar elasticity and hardness. In addition, it was confirmed that the freezing resistance was obtained in all the examples.

Example 7

With the blending shown in Tables 8 and 9, emulsified compositions of Examples 7-1 to 7-9 were prepared and baked by the same method as in Example 3.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. In addition, in Examples 7-1 to 7-5, the freezing resistance was evaluated by the same method as in Example 5. The evaluation results are shown in Tables 8 and 9.

TABLE 8

|  |  | Example 7-1 | Example 7-2 | Example 7-3 | Example 7-4 | Example 7-5 |
|---|---|---|---|---|---|---|
| Blending (parts by mass) | Methyl cellulose A | 1.0 | 1.0 | 1.0 | 1.0 | 1.0 |
|  | Powdery material 1 | 1.0 | 1.0 | 1.0 | 1.0 | 1.0 |
|  | Rapeseed oil | 2.0 | 3.0 | 4.0 | 6.0 | 10.0 |
|  | Defatted soy flour A | 0.3 | 0.3 | 0.3 | 0.3 | 0.3 |
|  | Water | 40.0 | 40.0 | 40.0 | 40.0 | 40.0 |
|  | Salt | 0.4 | 0.4 | 0.4 | 0.4 | 0.4 |
|  | Total | 44.7 | 45.7 | 46.7 | 48.7 | 52.7 |
| Evaluation | State before heating | 4 | 4 | 4 | 4 | 4 |
|  | State during baking (frying pan baking) | 4 | 4 | 5 | 4 | 5 |
|  | State after baking (frying pan baking) | 3 | 4 | 4 | 4 | 5 |
|  | State after baking (oven baking) | 3 | 3 | 4 | 4 | 5 |
|  | Freezing resistance | Obtained | Obtained | Obtained | Obtained | Obtained |

TABLE 9

|  |  | Example 7-6 | Example 7-7 | Example 7-8 | Example 7-9 |
|---|---|---|---|---|---|
| Blending (parts by mass) | Methyl cellulose A | 1.0 | 1.0 | 1.0 | 1.0 |
|  | Powdery material 1 | 1.0 | 1.0 | 1.0 | 1.0 |
|  | Rapeseed oil | 4.0 | 10.0 | 20.0 | 30.0 |
|  | Defatted soy flour A | 0.3 | 0.3 | 0.3 | 0.3 |
|  | Water | 30.0 | 30.0 | 30.0 | 30.0 |
|  | Salt | 0.4 | 0.4 | 0.4 | 0.4 |
|  | Total | 36.7 | 42.7 | 52.7 | 62.7 |
| Evaluation | State before heating | 5 | 5 | 5 | 5 |
|  | State during baking (frying pan baking) | 5 | 5 | 5 | 5 |
|  | State after baking (frying pan baking) | 5 | 5 | 4 | 4 |
|  | State after baking (oven baking) | 5 | 5 | 4 | 4 |
|  | Freezing resistance | — | — | — | — |

As a result, as shown in Tables 8 and 9, in Examples 7-1 to 7-9, an emulsified composition with an excellent state before the heating, during the baking, and after the baking could be obtained. In addition, in Examples 7-1 to 7-5 in which the freezing resistance was evaluated, it was confirmed that the freezing resistance was obtained in all the examples.

Example 8

With the blending shown in Table 10, emulsified compositions of Examples 8-1 to 8-3 were prepared and baked by the same method as in Example 3.

A state of the emulsified composition before heating, a state of the emulsified composition during baking (during frying pan baking), and a state of the emulsified composition after baking (after oven baking and after frying pan baking) were evaluated by the same method as in Example 1 by two specialized panelists. The evaluation results are shown in Table 10.

TABLE 10

|  |  | Example 8-1 | Example 8-2 | Example 8-3 |
|---|---|---|---|---|
| Blending (parts by mass) | Methyl cellulose A | 1.0 | 1.0 | 1.0 |
|  | Powdery material 1 | 1.0 | 1.0 | 1.0 |
|  | Rapeseed oil | 10.0 | 10.0 | 10.0 |
|  | Defatted soy flour A | 0.6 |  |  |
|  | Pea protein |  | 0.3 | 0.6 |
|  | Water | 30.0 | 30.0 | 30.0 |
|  | Salt | 0.4 | 0.4 | 0.4 |
|  | Total | 43.0 | 42.7 | 43.0 |
| Evaluation | State before heating | 5 | 4 | 5 |
|  | State during baking (frying pan baking) | 5 | 5 | 5 |
|  | State after baking (frying pan baking) | 4 | 5 | 5 |
|  | State after baking (oven baking) | 4 | 5 | 5 |

As a result, as shown in Table 10, in all of the examples, an emulsified composition with an excellent state before the heating, during the baking, and after the baking could be obtained.

Example 9

(Preparation of Emulsified Composition)

With the blending shown in Table 11, an emulsified composition (oil-in-water type) of Preparation Example 1 was produced. A production method is the same as the procedures 1. to 4. of Example 3, except that a caramel pigment was additionally added in the procedure 1. of Example 3.

TABLE 11

|  |  | Preparation Example 1 |
|---|---|---|
| Blending (parts by mass) | Methyl cellulose A | 2.3 |
|  | Powdery material 1 | 2.3 |
|  | Rapeseed oil | 23.4 |
|  | Defatted soy flour A | 0.7 |
|  | Water | 70.1 |
|  | Salt | 0.9 |
|  | Caramel pigment | 0.2 |
|  | Total | 100.0 |

(Producing Soybean Hamburg Steak)

With the blending shown in Table 12, soybean hamburg steaks of Control Example 9-1, Comparative Example 9-2, and Examples 9-1 and 9-2 were produced by the following procedure.

1. Each material was weighed into a bowl and mixed.
2. The produced emulsified composition (Preparation Example 1) was added to a mixture of the part 1. and mixed well by hand.
3. 50 g of a resultant material of the part 2. was weighed and a soybean hamburg steak was formed in a cercle (round, bottomless mould).
4. The soybean hamburg steak was placed on a frying pan and baked over medium heat for 3 minutes.

A binding property, an elasticity, and stickiness of the produced soybean hamburg steak were evaluated. Three specialized panelists performed the evaluation on a five-point scale according to the following criteria, and an average point was regarded as a score. A score of equal to or higher than 3 was considered acceptable. The evaluation results are shown in Table 12.

(Binding Property)

5 points: A significant binding power and extremely excellent formability and shape retention after baking 4 points: A binding power and excellent formability and shape retention after baking 3 points: Slight binding power, formable, and a shape is retained even after baking 2 points: Almost no binding power, forming is a little difficult, and a shape is slightly collapsed even after baking 1 point: No binding power, difficult to form, a shape has been collapsed even after baking (Elasticity)

5 points: Having a considerable elastic power 4 points: Having an elastic power 3 points: Having a slight elastic power 2 points: Having almost no elastic power 1 point: Having no elastic power (Stickiness)

5 points: No stickiness at all 4 points: Almost no stickiness 3 points: Slightly sticky, but acceptable 2 points: Slightly sticky 1 point: Considerably sticky

TABLE 12

| | | Control Example 9-1 | Comparative Example 9-2 | Example 9-1 | Example 9-2 |
|---|---|---|---|---|---|
| Blending (parts by mass) | Granular soybean protein material A | 13.8 | 13.8 | 13.8 | 13.8 |
| | Granular soybean protein material B | 11.1 | 11.1 | 11.1 | 11.1 |
| | Granular soybean protein material C | 7.7 | 7.7 | 7.7 | 7.7 |
| | Black pepper | 0.1 | 0.1 | 0.1 | 0.1 |
| | Table salt | 0.3 | 0.3 | 0.3 | 0.3 |
| | Granulated sugar | 0.5 | 0.5 | 0.5 | 0.5 |
| | Umami seasoning | 0.5 | 0.5 | 0.5 | 0.5 |
| | Beetroot powder | 0.1 | 0.1 | 0.1 | 0.1 |
| | Caramel pigment | 0.2 | 0.2 | 0.2 | 0.2 |
| | Sauteed onion | 6.1 | 6.1 | 6.1 | 6.1 |
| | Solid fat | 6.6 | 6.6 | 6.6 | 6.6 |
| | Cylindrical fat | 3.1 | 3.1 | 3.1 | 3.1 |
| | Preparation Example 1 | | 5 | 5 | 10 |
| | Dry egg white powder | 5 | | | |
| | Water | 10 | | | |
| | Total | 65.0 | 50.0 | 55.0 | 60.0 |

TABLE 12-continued

| | | Control Example 9-1 | Comparative Example 9-2 | Example 9-1 | Example 9-2 |
|---|---|---|---|---|---|
| Evaluation | Binding property | 3 | 1 | 4 | 4 |
| | Elasticity | 3 | 1 | 3 | 3 |
| | Stickiness | 4 | 3 | 3 | 3 |

As a result, as shown in Table 12, in Examples 9-1 and 9-2, a soybean hamburg steak having a binding property and an elasticity at least equivalent to Control Example 9-1, in which an egg white was used, could be obtained.

Example 10

(Preparation of Emulsified Composition)

With the blending shown in Table 13, emulsified compositions (oil-in-water type) of Preparation Example 2-1 to 2-5 were produced. A production method is the same as the procedures 1. to 4. of Example 3, except that a caramel pigment was additionally added in the procedure 1. of Example 3.

TABLE 13

| | | Preparation Example 2-1 | Preparation Example 2-2 | Preparation Example 2-3 | Preparation Example 2-4 | Preparation Example 2-5 |
|---|---|---|---|---|---|---|
| Blending (parts by mass) | Methyl cellulose A | 1.4 | 1.4 | 1.4 | 1.4 | 1.4 |
| | Powdery material 1 | 1.2 | | | | |
| | Distarch phosphate from tapioca starch | | 1.2 | | | |
| | Gelatinized and acetylated distarch phosphate from tapioca starch | | | 1.2 | | |
| | Acetylated wheat starch | | | | 1.2 | |
| | Oil or fat-processed pea starch | | | | | 1.2 |
| | Rapeseed oil | 4.8 | 4.8 | 4.8 | 4.8 | 4.8 |
| | Soymilk | 33.6 | 33.6 | 33.6 | 33.6 | 33.6 |
| | Salt | 0.5 | 0.5 | 0.5 | 0.5 | 0.5 |
| | Caramel pigment | 0.1 | 0.1 | 0.1 | 0.1 | 0.1 |
| | Total | 41.6 | 41.6 | 41.6 | 41.6 | 41.6 |

(Producing Soybean Hamburg Steak)

With the blending shown in Table 14, soybean hamburg steaks of Examples 10-1 to 10-5 were produced by the following procedure.

1. Each material was weighed into a bowl and mixed.

2. The produced emulsified composition was added to a mixture of the part 1. and mixed well by hand.

3. 50 g of a resultant material of the part 2. was weighed and a soybean hamburg steak was formed in a cercle.

4. A resultant material of the part 3. was stored frozen in a freezer at –20° C. for 15 hours.

5. The soybean hamburg steak was placed on a frying pan in a frozen state and baked over medium heat for 7 minutes.

A binding property, an elasticity, and stickiness of the produced soybean hamburg steak were evaluated. Two specialized panelists performed the evaluation for the binding property and the elasticity and four specialized panelists performed the evaluation for the stickiness according to the same evaluation criteria as in Example 9, and an average point was regarded as a score. A score of equal to or higher than 3 was considered acceptable. The evaluation results are shown in Table 14. "-" in Table 14 indicates unevaluated.

TABLE 14

|  |  | Example 10-1 | Example 10-2 | Example 10-3 | Example 10-4 | Example 10-5 |
|---|---|---|---|---|---|---|
| Blending (parts by mass) | Granular soybean protein material A | 21.6 | 21.6 | 21.6 | 21.6 | 21.6 |
|  | Granular soybean protein material B | 17.4 | 17.4 | 17.4 | 17.4 | 17.4 |
|  | Granular soybean protein material C | 12.0 | 12.0 | 12.0 | 12.0 | 12.0 |
|  | Black pepper | 0.1 | 0.1 | 0.1 | 0.1 | 0.1 |
|  | Table salt | 0.5 | 0.5 | 0.5 | 0.5 | 0.5 |
|  | Granulated sugar | 0.8 | 0.8 | 0.8 | 0.8 | 0.8 |
|  | Umami seasoning | 0.8 | 0.8 | 0.8 | 0.8 | 0.8 |
|  | Beetroot powder | 0.1 | 0.1 | 0.1 | 0.1 | 0.1 |
|  | Caramel pigment | 0.2 | 0.2 | 0.2 | 0.2 | 0.2 |
|  | Sauteed onion | 9.6 | 9.6 | 9.6 | 9.6 | 9.6 |
|  | Solid fat | 10.3 | 10.3 | 10.3 | 10.3 | 10.3 |
|  | Cylindrical fat | 4.8 | 4.8 | 4.8 | 4.8 | 4.8 |
|  | Preparation Example 2-1 | 41.6 |  |  |  |  |
|  | Preparation Example 2-2 |  | 41.6 |  |  |  |
|  | Preparation Example 2-3 |  |  | 41.6 |  |  |
|  | Preparation Example 2-4 |  |  |  | 41.6 |  |
|  | Preparation Example 2-5 |  |  |  |  | 41.6 |
|  | Total | 120.0 | 120.0 | 120.0 | 120.0 | 120.0 |
| Evaluation | Binding property | 5 | 5 | 5 | 5 | 5 |
|  | Elasticity | 4 | 4 | 4 | 4 | 4 |
|  | Stickiness | 5.0 | 4.3 | — | 3.0 | 4.5 |

As a result, as shown in Table 14, in all the examples, a soybean hamburg steak having excellent binding property and elasticity could be obtained. In addition, the stickiness when eating the soybean hamburg steak was most excellent in a case of Example 10-1 in which the emulsified composition of the powdery material 1 was used, and was excellent secondly in a case of Example 10-5, that is, an emulsified composition, in which the raw material starch of the starch material was the pea starch, was used.

Example 11

(Preparation of Emulsified Composition)

With the blending shown in Table 15, an emulsified composition (oil-in-water type) of Preparation Example 3 was produced. A production method is the same as the procedures 1. to 4. of Example 3, except that a caramel pigment was additionally added in the procedure 1. of Example 3.

TABLE 15

|  |  | Preparation Example 3 |
|---|---|---|
| Blending (parts by mass) | Methyl cellulose A | 2.2 |
|  | Powdery material 1 | 1.2 |
|  | Soymilk | 30.0 |
|  | Seasoning oil | 4.8 |
|  | Salt | 0.5 |
|  | Caramel pigment | 0.1 |
|  | Total | 38.8 |

(Producing Soybean Hamburg Steak)

With the blending shown in Table 16, soybean hamburg steaks of Examples 11-1 to 11-5 were produced. The production was performed in the same procedure as in Example 10 up to the forming of the soybean hamburg steak. After the forming, as shown in Table 16, in each example, the soybean hamburg steak was produced by changing conditions of the presence or absence of the baking after the forming, a storage state, and the presence or absence of thawing before the baking. After that, the soybean hamburg steak was baked using a frying pan over medium heat for 7 minutes. In a case of frozen storage, it was stored in a freezer at –20° C. for 96 hours, and in a case of refrigerated storage, it was stored in a refrigerator at 6° C. for 96 hours.

A binding property, an elasticity, a baking yield, and freezing resistance of the produced soybean hamburg steak were evaluated. Two specialized panelists performed the evaluation for the binding property and the elasticity by the same method as in Example 9. The baking yield and the freezing resistance were evaluated by the following method. The evaluation results are shown in Table 16.

(Baking Yield)

A mass of the hamburg steak before baking and a mass of the hamburg steak after baking were measured to determine the baking yield (%). Specifically, the baking yield was calculated using the following equation.

Baking yield (%)=(a mass after baking (g)/a mass before baking (g))×100

(Freezing Resistance)

In an example with the frozen storage, it was confirmed that there is no change in a state of the hamburg steak before and after the freezing. In a case where there was no change in the state, it was determined that the freezing resistance is obtained, and in a case where there is a change in the state, it was determined that the freezing resistance is not obtained.

TABLE 16

| | | Example 11-1 | Example 11-2 | Example 11-3 | Example 11-4 | Example 11-5 |
|---|---|---|---|---|---|---|
| Blending (parts by mass) | Granular soybean protein material A | 21.6 | 21.6 | 21.6 | 21.6 | 21.6 |
| | Granular soybean protein material B | 17.4 | 17.4 | 17.4 | 17.4 | 17.4 |
| | Granular soybean protein material C | 12.0 | 12.0 | 12.0 | 12.0 | 12.0 |
| | Black pepper | 0.1 | 0.1 | 0.1 | 0.1 | 0.1 |
| | Table salt | 0.5 | 0.5 | 0.5 | 0.5 | 0.5 |
| | Granulated sugar | 0.8 | 0.8 | 0.8 | 0.8 | 0.8 |
| | Umami seasoning | 0.8 | 0.8 | 0.8 | 0.8 | 0.8 |
| | Beetroot powder | 0.1 | 0.1 | 0.1 | 0.1 | 0.1 |
| | Caramel pigment | 0.2 | 0.2 | 0.2 | 0.2 | 0.2 |
| | Sauteed onion | 9.6 | 9.6 | 9.6 | 9.6 | 9.6 |
| | Solid fat | 12.0 | 12.0 | 12.0 | 12.0 | 12.0 |
| | Cylindrical fat | 6.0 | 6.0 | 6.0 | 6.0 | 6.0 |
| | Preparation Example 3 | 38.8 | 38.8 | 38.8 | 38.8 | 38.8 |
| | Total | 120.0 | 120.0 | 120.0 | 120.0 | 120.0 |
| Condition | Presence or absence of baking after forming | — | Not baked | Baked | Not baked | Baked |
| | Storage state | Refrigerated | Frozen | Frozen | Frozen | Frozen |
| | Presence or absence of thawing before the baking | — | Thawed | Thawed | Not thawed (baked in frozen state) | Not thawed (baked in frozen state) |
| Evaluation | Binding property | 5 | 5 | 5 | 5 | 5 |
| | Elasticity | 4 | 4 | 4 | 4 | 4 |
| | Baking yield | 83.6% | 83.4% | 74.8% | 82.0% | 78.4% |
| | Freezing resistance | — | Obtained | Obtained | Obtained | Obtained |

As a result, as shown in Table 16, in all the examples, a soybean hamburg steak having excellent binding property and elasticity and having the freezing resistance could be obtained. In addition, in Examples 11-3 and 11-5, the baking yield was low, compared to other examples, because the baking was performed twice, however, it was considered that there is no practical effect on the baking yield due to the usage of the emulsified composition.

Example 12

(Preparation of Emulsified Composition)

With the blending shown in Table 17, emulsified compositions (oil-in-water type) of Preparation Example 4-1 to 4-3 were produced. A production method is the same as the procedures 1. to 4. of Example 3.

TABLE 17

| | | Prepa-ration Example 4-1 | Prepa-ration Example 4-2 | Prepa-ration Example 4-3 |
|---|---|---|---|---|
| Blending (parts by mass) | Methyl cellulose A | 0.5 | 0.5 | 0.5 |
| | Powdery material 1 | 0.5 | 0.5 | 0.5 |
| | Distarch phosphate from tapioca starch | | 0.5 | |
| | Oil or fat-processed pea starch | | | 0.5 |
| | Rapeseed oil | 5.0 | 5.0 | 5.0 |
| | Defatted soy flour A | 0.2 | 0.2 | 0.2 |
| | Water | 15.0 | 15.0 | 15.0 |
| | Salt | 0.2 | 0.2 | 0.2 |
| | Total | 21.4 | 21.9 | 21.9 |

(Producing Soybean Hamburg Steak)

With the blending shown in Table 18, soybean hamburg steaks of Control Example 12-1, Comparative Example 12-2, and Examples 12-1 to 12-3 were produced. The production was performed in the same procedure as in Example 9 up to the forming of the soybean hamburg steak, and then, the soybean hamburg steak was baked in an oven at 200° C. for 8 minutes.

Formability, a binding property, and stickiness of the produced soybean hamburg steak were evaluated. Regarding the formability, one specialized panelist performed the evaluation on a five-point scale according to the following criteria, and the score of equal to or higher than 3 points was considered acceptable. Regarding the binding property and the stickiness, three specialized panelists performed the evaluation on a five-point scale according to the following criteria, and an average point was regarded as a score. A score of equal to or higher than 2 was considered acceptable. The evaluation results are shown in Table 18.

(Formability)

5 points: Better formability than Control Example 12-1

4 points: Slightly better formability than Control Example 12-1

3 points: Formability equivalent to Control Example 12-1

2 points: Slightly poorer formability than Control Example 12-1

1 point: Difficult to form compared to Control Example 12-1

(Binding Property)

5 points: Significant binding power than Control Example 12-1

4 points: Slightly more binding power than Control Example 12-1

3 points: Binding power equivalent to Control Example 12-1

2 points: Slightly no binding power than Control Example 12-1

1 point: Less binding power than Control Example 12-1

(Stickiness)

5 points: Less sticky than Control Example 12-1 and excellent tenderness 4 points: Slightly less sticky than Control Example 12-1 and excellent tenderness 3 points: Stickiness equivalent to Control Example 12-1

2 points: Slightly stronger stickiness than Control Example 12-1, but acceptable 1 point: Much stronger stickiness than Control Example 12-1

TABLE 18

| | | Control Example 12-1 | Comparative Example 12-2 | Example 12-1 | Example 12-2 | Example 12-3 |
|---|---|---|---|---|---|---|
| Blending (parts by mass) | Granular soybean protein material A | 22.0 | 22.0 | 22.0 | 22.0 | 22.0 |
| | Granular soybean protein material B | 18.0 | 18.0 | 18.0 | 18.0 | 18.0 |
| | Granular soybean protein material C | 12.0 | 12.0 | 12.0 | 12.0 | 12.0 |
| | Black pepper | 0.2 | 0.2 | 0.2 | 0.2 | 0.2 |
| | Table salt | 0.5 | 0.5 | 0.5 | 0.5 | 0.5 |
| | Granulated sugar | 0.9 | 0.9 | 0.9 | 0.9 | 0.9 |
| | Umami seasoning | 0.9 | 0.9 | 0.9 | 0.9 | 0.9 |
| | Beetroot powder | 0.2 | 0.2 | 0.2 | 0.2 | 0.2 |
| | Caramel pigment | 0.3 | 0.3 | 0.3 | 0.3 | 0.3 |
| | Sauteed onion | 10.0 | 10.0 | 10.0 | 10.0 | 10.0 |
| | Solid fat | 10.0 | 10.0 | 10.0 | 10.0 | 10.0 |
| | Cylindrical fat | 5.2 | 5.2 | 5.2 | 5.2 | 5.2 |
| | Rapeseed oil | 5.0 | 5.0 | | | |
| | Water | 15.0 | 15.0 | | | |
| | Dry egg white powder | 3.0 | | | | |
| | Preparation Example 4-1 | | | 21.4 | | |
| | Preparation Example 4-2 | | | | 21.9 | |
| | Preparation Example 4-3 | | | | | 21.9 |
| | Total | 103.0 | 100.0 | 101.4 | 101.9 | 101.9 |
| Evaluation | Formability | 3.0 | 3.0 | 4.0 | 4.0 | 4.0 |
| | Binding property | 3.0 | 1.0 | 2.5 | 2.8 | 3.3 |
| | Stickiness | 3.0 | 2.7 | 3.0 | 3.0 | 3.0 |

As a result, as shown in Table 18, in Examples 12-1 to 12-3, a soybean hamburg steak having a binding property equivalent to that of Control Example 12-1, in which an egg white was used, could be obtained. In addition, even for the formability of the soybean hamburg steak or the stickiness when eating the soybean hamburg steak, excellent results at least equivalent to those of Control Example 12-1 were obtained.

Example 13

In the present examples, production and evaluation of hamburg steaks were carried out by using the produced emulsified composition.
(Preparation of Emulsified Composition)

An emulsified composition having the same composition as in Example 7-7 was produced by the same method.
(Producing of Hamburg Steak)

With the blending shown in Table 19, hamburg steaks of Control Example 13-1, Comparative Example 13-2, and Example 13 were produced by the following procedure.

1. Each material was weighed into a bowl and mixed.
2. 50 g of a resultant material of the part 1. was weighed and a hamburg steak was formed in a cercle.
3. Each side was baked in a frying pan over high heat for 1 minute until the surface was baked, placed on a tray, and baked in an oven at 200° C. for 7 minutes.

A binding property, an elasticity, juiciness, and a baking yield of the produced hamburg steak were evaluated. Regarding the binding property, two specialized panelists performed the evaluation according to the same criteria as in Example 12, except that the comparison was performed with Control Example 13-1, and an average point was regarded as a score. Regarding the elasticity and the juiciness, three specialized panelists performed the evaluation on a five-point scale according to the following criteria, and an average point was regarded as a score. For each evaluation item, a score of equal to or higher than 2 points was considered acceptable. The baking yield was evaluated according to the same criteria as in Example 11. The evaluation results are shown in Table 19.
(Elasticity)

5 points: Stronger elasticity than Control Example 13-1
  4 points: Slightly stronger elasticity than Control Example 13-1
  3 points: Elasticity equivalent to that of Control Example 13-1
  2 points: Slightly less elasticity than Control Example 13-1
  1 point: Less elasticity than Control Example 13-1
(Juiciness)

5 points: Juicier than Control Example 13-1
  4 points: Slightly juicier than Control Example 13-1
  3 points: Juiciness equivalent to Control Example 13-1
  2 points: Slightly dry compared to Control Example 13-1
  1 point: Considerably drier than Control Example 13-1

TABLE 19

| | | Control Example 13-1 | Comparative Example 13-2 | Example 13 |
|---|---|---|---|---|
| Blending (parts by mass) | Minced beef | 60.0 | 65.2 | 60.0 |
| | Minced pork | 60.0 | 65.2 | 60.0 |
| | Onion | 30.0 | 32.6 | 30.0 |
| | Bread crumbs | 20.0 | 21.7 | 20.0 |
| | Table salt | 1.8 | 2.0 | 1.8 |

TABLE 19-continued

| | | Control Example 13-1 | Comparative Example 13-2 | Example 13 |
|---|---|---|---|---|
| | Pepper | 0.2 | 0.2 | 0.2 |
| | Umami seasoning | 0.8 | 0.9 | 0.8 |
| | Milk | 11.2 | 12.2 | 11.2 |
| | Liquid egg | 16.0 | | |
| | Example 7-7 | | | 16.0 |
| | Total | 200.0 | 200.0 | 200.0 |
| Evaluation | Binding property | 3 | 3 | 3 |
| | Elasticity | 3 | 2 | 3 |
| | Juiciness | 3 | 1 | 3 |
| | Baking yield | 84.3% | 75.7% | 89.6% |

As a result, as shown in Table 19, in Example 13, a hamburg steak having a binding property, an elasticity, and juiciness equivalent to those of Control Example 13-1, in which an egg white was used, could be obtained. In addition, the baking yield was most excellent in Example 13.

Example 14

In the present examples, production and evaluation of Kamaboko were carried out by using the produced emulsified composition.
(Preparation of Emulsified Composition)

An emulsified composition having the same composition as in Example 7-7 was produced by the same method.
(Producing of Kamaboko)

With the blending shown in Table 20, Kamaboko of Control Example 14-1, Comparative Examples 14-2 and 14-3, and Example 14 were produced by the following procedure.

1. Surimi of frozen Alaska pollock was cut and finely pulverized with a food processor (a food processor, manufactured by Cuisinart Corporation).
2. Table salt was added to and mixed with a resultant material of the part 1.
3. ⅓ amount of ice was added to and mixed with a resultant material of the part 2.
4. Ingredients except for the table salt and ⅓ amount of ice were added to and mixed with a resultant material of the part 3.
5. Remaining ⅓ amount of ice was added to and mixed with the resultant material of the part 4.
6. A resultant material of the part 5. was put into a plastic bag with a fastener and degassed with a vacuum packaging machine (Hot Temp, manufactured by Nichiwa Electric Corporation).
7. Vinyl casings were filled with a resultant material of the part 6., and then pre-heated at 30° C. for 90 minutes.
8. A resultant material of the part 7. was heated in a hot water at 85° C. for 20 minutes.
9. A resultant material of the part 8. was put into ice water and cooled for 10 minutes.

A binding property, hardness, elasticity, and easiness to bite of the produced Kamaboko were evaluated. With regard to hardness and elasticity, measurement with a texture analyzer was also carried out in addition to sensory evaluation. Regarding the binding property, one specialized panelist performed the evaluation according to the same criteria as in Example 12, except that the comparison was performed with Control Example 14-1, and an average point was regarded as a score. Regarding the hardness, elasticity, and easiness to bite, three specialized panelists performed the evaluation on a five-point scale according to the following criteria, and an average point was regarded as a score. For each evaluation item, a score of equal to or higher than 3 points was considered acceptable. In the measurement of the texture analyzer, breaking strength (g) was measured by the following method. The evaluation results are shown in Table 20.

(Hardness)

5 points: Harder than Control Example 14-1

4 points: Slightly harder than Control Example 14-1

3 points: Having hardness equivalent to that of Control Example 14-1

2 points: A little softer than Control Example 14-1

1 point: Much softer than Control Example 14-1

(Elasticity and Easiness to Bite)

5 points: More elastic and easier to bite than Control Example 14-1

4 points: Slightly more elastic and easier to bite than Control Example 14-1

3 points: Having elasticity and easiness to bite equivalent to those of Control Example 14-1

2 points: Slightly not elastic and slightly not easier to bite than Control Example 14-1

1 point: Not elastic and not easier to bite than Control Example 14-1

(Measurement with Texture Analyzer)

A casing was peeled off from the Kamaboko filled in the casing, and the cylindrical Kamaboko having a diameter of 30 mm cut to have a thickness of 25 mm was obtained as a measurement sample. A sample was placed on a sample stage, with the cut surfaces facing up and down, the sample was penetrated through by 15 mm at the central part from the sample upper surface at a compression rate of 1 mm/sec at room temperature (about 20° C.) with a texture analyzer (TA-XT Plus, manufactured by Stable Micro Systems, Ltd.) equipped with a ball-shaped probe having a diameter of 5 mm, and a force of a probe for breaking (a breaking strength (g)) the Kamaboko was measured. The breaking strength is an index indicating hardness.

TABLE 20

| Blend- ing (parts by mass) | | Control Exam- ple 14-1 | Compara- tive Exam- ple 14-2 | Compara- tive Exam- ple 14-3 | Exam- ple 14 |
|---|---|---|---|---|---|
| | Alaska pollock surimi | 138.0 | 138.0 | 138.0 | 138.0 |
| | Potato starch | 10.2 | 10.2 | 10.2 | 10.2 |
| | Sugar | 6.3 | 6.3 | 6.3 | 6.3 |
| | Powdery soybean protein material | 6.3 | 6.3 | 6.3 | 6.3 |
| | Table salt | 4.5 | 4.5 | 4.5 | 4.5 |
| | Rapeseed oil | 3.0 | 3.0 | 3.0 | 3.0 |
| | Sake | 3.0 | 3.0 | 3.0 | 3.0 |
| | Instant bouillon | 0.8 | 0.8 | 0.8 | 0.8 |
| | Umami seasoning | 3.0 | 3.0 | 3.0 | 3.0 |
| | Calcium carbonate | 0.2 | 0.2 | 0.2 | 0.2 |
| | Shellfish calcium | 0.2 | 0.2 | 0.2 | 0.2 |
| | Ice | 114.0 | 114.0 | 114.0 | 114.0 |
| | Dry egg white powder | 1.5 | | | |
| | Example 7-7 | | | | 6.0 |
| | Methyl cellulose A | | | 0.2 | |
| | Powdery material 1 | | | 0.2 | |
| | Rapeseed oil | | | 2.5 | |
| | Defatted soy flour A | | | 0.2 | |
| | Salt | | | 0.1 | |
| | Water | 9.0 | 9.0 | 7.4 | |
| | Total | 299.9 | 298.4 | 299.9 | 295.4 |

TABLE 20-continued

| | | Control Exam- ple 14-1 | Compara- tive Exam- ple 14-2 | Compara- tive Exam- ple 14-3 | Exam- ple 14 |
|---|---|---|---|---|---|
| Evalua- tion | Binding property | 3.0 | 3.0 | 3.0 | 3.0 |
| | Hardness | 3.0 | 2.0 | 2.4 | 3.6 |
| | Elasticity, crispiness | 3.0 | 1.8 | 2.0 | 3.0 |
| | Breaking strength (g) | 297.80 | 266.44 | 264.18 | 326.80 |

As a result, as shown in Table 20, in Example 14, Kamaboko having a binding property, hardness, elasticity, and easiness to bite equivalent to or more than those of Control Example 14-1, in which an egg white was used, could be obtained. In contrast, in Comparative Example 14-3 in which the raw materials of the emulsified composition were added as they were and the emulsified composition was not prepared in advance, the hardness, the elasticity, and the easiness to bite were not excellent, compared to Example 14.

This application claims priority based on Japanese Patent Application No. 2021-029972, filed on Feb. 26, 2021, and Japanese Patent Application No. 2021-053331, filed on Mar. 26, 2021, the entire disclosures of which are hereby incorporated.

The invention claimed is:

1. An emulsified composition comprising:

methyl cellulose;

a starch material;

edible oil or fat; and an emulsifying material, wherein the emulsifying material contains protein, a content of the starch material is 0.05 or more and 1.3 or less in terms of a mass ratio to the methyl cellulose, and the starch material is one or two kinds selected from the group consisting of a component (A) and a component (B) below, component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3 \times 10^3$ and equal to or less than $5 \times 10^4$, (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass, and component (B): a starch material, a raw material starch of which is one kind or two or more kinds selected from the group consisting of a cornstarch, a tapioca starch, a wheat starch, and a pea starch.

2. The emulsified composition according to claim 1, wherein the emulsified composition is a composition for imparting at least one of a binding property and an elasticity to a food.

3. The emulsified composition according to claim 1, wherein a content of the edible oil and fat is 1 or more and 40 or less in terms of a mass ratio to the methyl cellulose.

4. The emulsified composition according to claim 1, wherein the starch material is the component (A).

5. A food comprising the emulsified composition according to claim 1.

6. The food according to claim 5, wherein the food is one selected from the group consisting of a processed meat food, a processed meat-like food, and a processed sea food.

7. A method for imparting at least one of a binding property and an elasticity to a food, the method comprising: blending the emulsified composition according to claim 1 as a raw material of the food.

8. A method for producing an emulsified composition containing methyl cellulose, a starch material, edible oil or fat, and an emulsifying material, the method comprising: obtaining an emulsion by mixing the methyl cellulose, the starch material, the edible oil or fat, and the emulsifying material, wherein the emulsifying material contains protein, a content of the starch material is 0.05 or more and 1.3 or less in terms of a mass ratio to the methyl cellulose, and the starch material is one or two kinds selected from the group consisting of a component (A) and a component (B) below, component (A): a powdery material satisfying the following conditions (1) to (4), (1) a starch content is equal to or more than 75% by mass, (2) a low molecular weight starch obtained from a starch having an amylose content of equal to or more than 5% by mass is contained, a content of the low molecular weight starch being equal to or more than 3% by mass and equal to or less than 45% by mass, and the low molecular weight starch has a peak molecular weight of equal to or more than $3 \times 10^3$ and equal to or less than $5 \times 10^4$ (3) a degree of swelling in cold water at 25° C. is equal to or more than 5 and equal to or less than 20, and (4) a content under a sieve with openings of 3.35 mm and on a sieve with openings of 0.038 mm is equal to or more than 60% by mass and equal to or less than 100% by mass; and component (B): a starch material, a raw material starch of which is one kind or two or more kinds selected from the group consisting of a cornstarch, a tapioca starch, a wheat starch, and a pea starch.

9. The method for producing an emulsified composition according to claim 8, wherein a content of the edible oil and fat is 1 or more and 40 or less in terms of a mass ratio to the methyl cellulose.

10. The method for producing an emulsified composition according to claim 9, wherein the starch material is the component (A).

11. A method for producing a food, the method comprising: obtaining an emulsified composition by the method for producing an emulsified composition according to claim 8; and obtaining a food by preparing a material containing the emulsified composition.

12. The method for producing a food according to claim 11, wherein the food is one selected from the group consisting of a processed meat food, a processed meat-like food, and a processed sea food.

\* \* \* \* \*